US012235599B2

(12) United States Patent
Yoshikawa et al.

(10) Patent No.: US 12,235,599 B2
(45) Date of Patent: Feb. 25, 2025

(54) IMAGE FORMING DEVICE

(71) Applicant: SHARP KABUSHIKI KAISHA, Sakai (JP)

(72) Inventors: Yoshihiro Yoshikawa, Sakai (JP); Hideshi Izumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/381,827

(22) Filed: Oct. 19, 2023

(65) Prior Publication Data

US 2024/0142898 A1 May 2, 2024

(30) Foreign Application Priority Data

Nov. 2, 2022 (JP) ................................ 2022-175905

(51) Int. Cl.
*G03G 15/16* (2006.01)

(52) U.S. Cl.
CPC ................................ *G03G 15/1615* (2013.01)

(58) Field of Classification Search
None
See application file for complete search history.

(56) References Cited

U.S. PATENT DOCUMENTS 9,046,825 B2 * 6/2015 Jung .................. G03G 15/0189
2006/0127140 A1 * 6/2006 Miyake .............. G03G 15/1675 399/302
2010/0221029 A1 * 9/2010 Minbu ............... G03G 15/0131 399/66
2011/0064487 A1 * 3/2011 Ichihashi ........... G03G 15/0136 399/302
2012/0237260 A1 * 9/2012 Sengoku .............. G03G 15/161 198/813
2013/0022380 A1 * 1/2013 Murakami ......... G03G 15/0189 399/313
2013/0061698 A1 3/2013 Izumi et al.
2014/0328608 A1 * 11/2014 Murakam .......... G03G 15/0194 399/313
2014/0334847 A1 * 11/2014 Takahashi .......... G03G 15/1605 399/121
2015/0346651 A1 * 12/2015 Nagata ............... G03G 15/1665 399/45
2016/0349672 A1 * 12/2016 Miyakoshi ......... G03G 15/1605
(Continued)

FOREIGN PATENT DOCUMENTS

EP 0042136 A1 * 12/1981
JP 2013-061367 A 4/2013

*Primary Examiner* — Sevan A Aydin
(74) *Attorney, Agent, or Firm* — ScienBiziP, P.C.

(57) ABSTRACT

An image forming device includes one or more image carriers on which a toner image is formed; a transfer belt that transfers a toner image formed on the image carrier; a presser that presses the transfer belt against the image carrier to transfer the toner image onto the transfer belt; and a switching mechanism that switches a position of the presser according to a rotation angle of a cam. The switching mechanism switches a position of the presser to one of a first position that presses the transfer belt against the image carrier, a second position that is separated from the image carrier, and a third position that is a position separated from the image carrier and having a smaller separation distance from the image carrier than the second position.

9 Claims, 7 Drawing Sheets

(56) References Cited

U.S. PATENT DOCUMENTS

| | | | | |
|---|---|---|---|---|
| 2017/0010566 | A1* | 1/2017 | Kato | G03G 15/1665 |
| 2019/0286003 | A1* | 9/2019 | Iwadate | G03G 15/50 |
| 2020/0201208 | A1* | 6/2020 | Kouzu | G03G 21/12 |
| 2021/0278785 | A1* | 9/2021 | Ashikawa | G03G 15/1615 |

* cited by examiner

FIG. 11

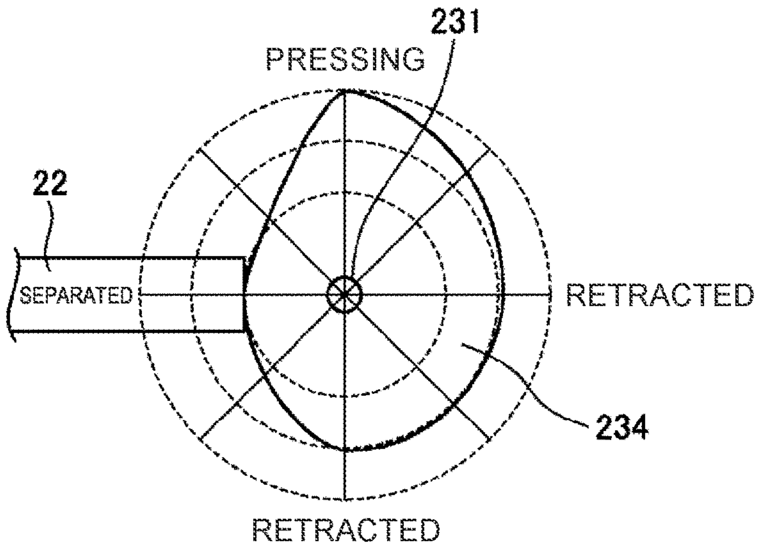

FIG. 12

| CAM ROTATION ANGLE | 0 DEGREES | 90 DEGREES | 180 DEGREES | 270 DEGREES |
|---|---|---|---|---|
| OPERATION STATE OF IMAGE FORMING DEVICE | ATTACHMENT/ DETACHMENT OF INTERMEDIATE TRANSFER DEVICE | PRINT STANDBY | MONOCHROME PRINTING | COLOR PRINTING |
| FIRST INTERMEDIATE TRANSFER ROLLER | SEPARATED | RETRACTED | PRESSING | PRESSING |
| SECOND TO FOURTH INTERMEDIATE TRANSFER ROLLERS | SEPARATED | RETRACTED | RETRACTED | PRESSING |

FIG. 13

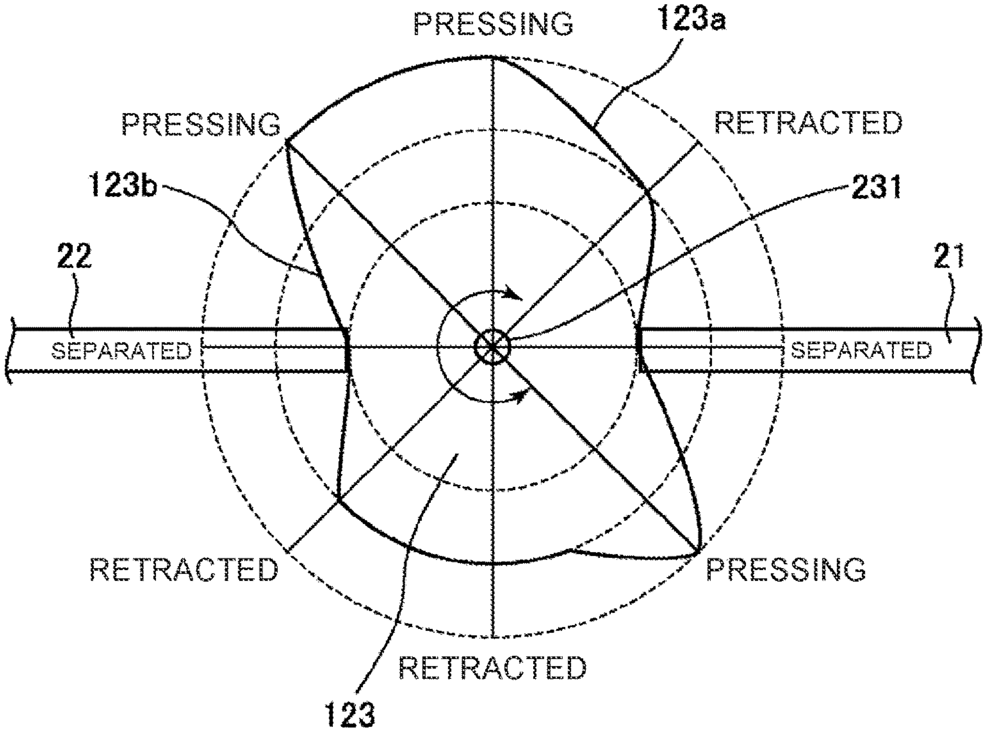

FIG. 14

| CAM ROTATION ANGLE | 0 DEGREES | 45 DEGREES | 90 DEGREES | 135 DEGREES |
|---|---|---|---|---|
| OPERATION STATE OF IMAGE FORMING DEVICE | ATTACHMENT/ DETACHMENT OF INTERMEDIATE TRANSFER DEVICE | PRINT STANDBY | MONOCHROME PRINTING | COLOR PRINTING |
| FIRST INTERMEDIATE TRANSFER ROLLER | SEPARATED | RETRACTED | PRESSING | PRESSING |
| SECOND TO FOURTH INTERMEDIATE TRANSFER ROLLERS | SEPARATED | RETRACTED | RETRACTED | PRESSING |

IMAGE FORMING DEVICE

CROSS-REFERENCE TO RELATED APPLICATION

The present application claims priority from Japanese Application JP2022-175905, filed on Nov. 2, 2022, the content of which is hereby incorporated by reference into this application.

BACKGROUND OF THE INVENTION

1. Field of the Invention

The present disclosure relates to an image forming device.

2. Description of the Related Art

As a conventional technique, proposed is an image forming device including a transfer device that transfers a toner image from an image carrier to a paper sheet via an intermediate transfer belt.

In the image forming device disclosed in the conventional technique, the transfer device is provided with a transfer roller that can be displaced in a direction that makes contact with, and separates from, the image carrier.

SUMMARY OF THE INVENTION

However, when a presser (transfer roller) in a position that is separated from the image carrier moves to a position that presses the image carrier, and then presses the image carrier, a large impact sound is generated between the presser and the image carrier.

An object of the present disclosure is to provide an image forming device that enables an impact sound generated when an image carrier is pressed by a presser to be suppressed.

An image forming device according to an aspect of the present disclosure includes: one or more image carriers on which a toner image is formed; a transfer belt that transfers a toner image formed on the image carrier; a presser that presses the transfer belt against the image carrier to transfer the toner image onto the transfer belt; and a switching mechanism that switches a position of the presser according to a rotation angle of a cam; wherein the switching mechanism switches a position of the presser to one of a first position that presses the transfer belt against the image carrier, a second position that is separated from the image carrier, and a third position that is a position separated from the image carrier and having a smaller separation distance from the image carrier than the second position.

According to an aspect of the present disclosure, an image forming device is capable of suppressing an impact sound generated when an image carrier is pressed by a presser.

BRIEF DESCRIPTION OF THE DRAWINGS

FIG. 11 is a diagram showing an example of a second cam of the cam shown in FIG. 9.

FIG. 12 is a table showing a correspondence relationship between the rotation angle of the cam included in the intermediate transfer belt unit according to the embodiment of the present disclosure, the operation state of the image forming device, the position of a first intermediate transfer roller, and the position of a second intermediate transfer roller to fourth intermediate transfer roller.

FIG. 13 is a diagram showing an example of a cam included in an intermediate transfer belt unit according to a modification of the embodiment of the present disclosure.

FIG. 14 is a table showing a correspondence relationship between the rotation angle of the cam included in the intermediate transfer belt unit according to the modification of the embodiment of the present disclosure, the operation state of the image forming device, the position of a first intermediate transfer roller, and the position of a second intermediate transfer roller to fourth intermediate transfer roller.

DETAILED DESCRIPTION OF THE INVENTION

Figure 1:
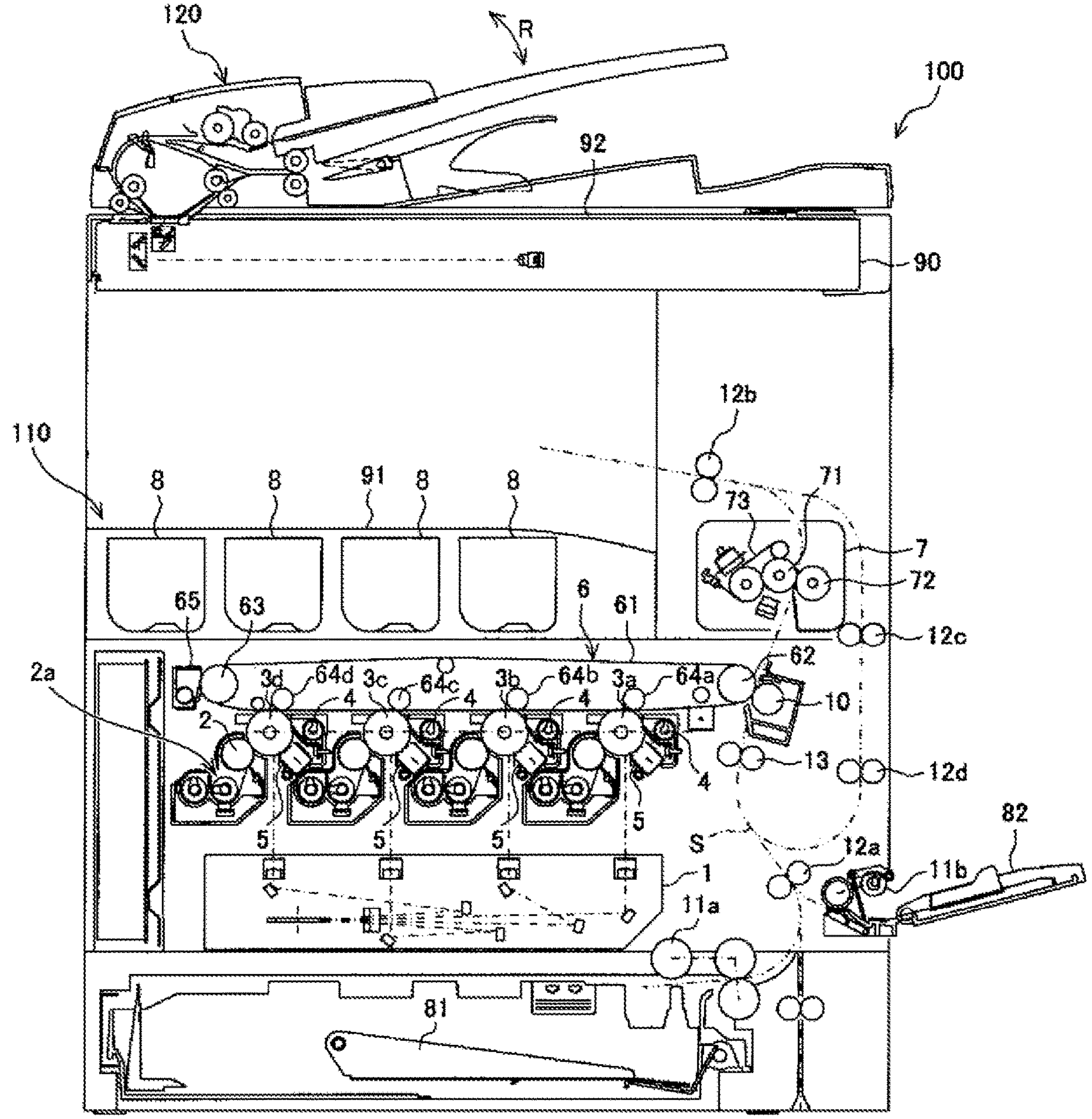
FIG. 1 is a schematic diagram showing an example of an internal structure of an image forming device according to an embodiment of the present disclosure.

Hereinafter, an embodiment and modification of the present disclosure will be described with reference to the accompanying drawings. The same reference numerals are given below to the same or equivalent components throughout all the drawings, and duplicate descriptions are omitted. The embodiment and modification described below are merely examples of the present disclosure, and the present disclosure is not limited to the embodiment and modification. In addition to the embodiment and modification, various changes may be made according to the design and the like without departing from the technical concept of the present disclosure.

An image forming device 100 according to the embodiment of the present disclosure will be described with reference to FIG. 1. FIG. 1 is a schematic diagram showing an example of an internal structure of an image forming device 100 according to the embodiment of the present disclosure. FIG. 1 is a diagram of the internal structure of the image forming device 100 when viewed from the front side. Note that, in the image forming device 100, of the horizontal directions when viewed from the front side, the left side is defined as the left direction, and the right side is defined as the right direction. Furthermore, of the depth directions when viewed from the front side, the front side (near side) of the image forming device 100 is defined as the front direction, and the rear side (far side) is defined as the rear direction. Moreover, in the image forming device 100, the bottom side is defined as the downward direction, and the opposite side is defined as the upward direction.

The image forming device 100 is a laser color printer that forms multicolor and monochrome images on a paper sheet on which an image is formed. The image forming device 100 prints an image on a paper sheet based on image data read from a document by an image reading device 90, or image data received from an external source. Note that, although a laser color printer is described as an example of the image forming device 100 in the present embodiment, the present disclosure is not limited to this.

As shown in FIG. 1, the image forming device 100 includes a printer 110, an image reading device 90, a document table 92, and an automatic document processing device 120. The printer 110 includes an exposure unit 1, developers 2, photoreceptor drums 3*a* to 3*d* (image carriers), cleaner units 4, chargers 5, an intermediate transfer belt unit 6, a fusing unit 7, a paper feeding cassette 81, and a manual paper feeding cassette 82. The photoreceptor drums 3*a* to 3*d* are simply referred to as the photoreceptor drums 3 when there is no need for the description to distinguish between them.

The upper part of the printer 110 is provided with the image reading device 90 and the document table 92, which is made of transparent glass. Furthermore, the automatic document processing device 120 is installed on the upper side of the document table 92.

The automatic document processing device 120 automatically transports a document onto the document table 92. Moreover, the automatic document processing device 120 is configured so as to be rotatable in the direction of arrow R. Further, a document can be placed on the document table 92 by opening the top of the document table 92.

The image reading device 90 reads image data from a document transported or placed on the document table 92. The printer 110 prints an image on a paper sheet based on the image data read by the image reading device 90.

The image data handled by the image forming device 100 corresponds to a color image that uses each of cyan (C), magenta (M), yellow (Y), and black (K) colors. Accordingly, the developers 2, the photoreceptor drums 3, the cleaner units 4, and the chargers 5 are each provided so as to form four types of latent images corresponding to the respective colors.

The chargers 5 uniformly charge the surfaces of the photoreceptor drums 3 to a predetermined potential. The chargers 5 may be charger type, contact type, or brush type chargers or the like.

The exposure unit 1 is configured as a laser scanning unit (LSU) provided with a laser emitter, a reflecting mirror, and the like. The exposure unit 1 includes polygon mirrors for performing scanning with a laser beam, and optical components, such as lenses or mirrors, for guiding the laser beam reflected by the polygon mirrors to the photoreceptor drums 3. The exposure unit 1 exposes the charged photoreceptor drums 3 according to the image data to form electrostatic latent images corresponding to the image data on the surfaces of the photoreceptor drums 3.

The developers 2 visualize the electrostatic latent images formed on the photoreceptor drums 3 using toner. The toner images are formed on the photoreceptor drums 3 as a result of being visualized with toner. The developers 2 include developer tanks 2*a*, and the toner is accommodated in the developer tanks 2*a*. The developers 2 are configured to supply the toner accommodated in the developer tanks 2*a* to the photoreceptor drums 3. Furthermore, the developer tanks 2*a* are connected to toner cartridges 8 that accommodate the toner via toner supply pipes (not shown). The toner cartridges 8 are provided for each of the four toner colors.

The cleaner units 4 remove and collect the residual toner remaining on the surfaces of the photoreceptor drums 3 after development and image transfer.

The intermediate transfer belt unit 6 is disposed above the photoreceptor drums 3. The intermediate transfer belt unit 6 includes an intermediate transfer belt 61 (transfer belt), an intermediate transfer belt drive roller 62, an intermediate transfer belt driven roller 63, a first intermediate transfer roller 64*a* to fourth intermediate transfer roller 64*d* (pressers), and an intermediate transfer belt cleaning unit 65. The first intermediate transfer roller 64*a* to fourth intermediate transfer roller 64*d* are provided corresponding to the respective colors of K, Y, M, and C. Note that the first intermediate transfer roller 64*a* to fourth intermediate transfer roller 64*d* are simply referred to as the intermediate transfer rollers 64 when there is no need for the description to distinguish between them.

The intermediate transfer belt drive roller 62, the intermediate transfer belt driven roller 63, and the first intermediate transfer roller 64*a* to fourth intermediate transfer roller 64*d* each stretch and rotationally drive the intermediate transfer belt 61.

The intermediate transfer rollers 64 apply a transfer bias for transferring the toner images of the photoreceptor drums 3 onto the intermediate transfer belt 61, and also press the photoreceptor drums 3. The position in which the intermediate transfer rollers 64 press the photoreceptor drums 3 via the intermediate transfer belt 61 is referred to as the pressing position (first position).

Furthermore, although not illustrated in FIG. 1, in the image forming device 100, the intermediate transfer belt unit 6 further includes a movement mechanism 20 (switching mechanism) that enables the intermediate transfer rollers 64 to move so as to make contact with, and separate from, the photoreceptor drums 3. The movement mechanism 20 provided in the intermediate transfer belt unit 6 will be described in detail later.

The intermediate transfer belt 61 is provided so as to make contact with each of the photoreceptor drums 3. Further, the toner images of each color formed on the photoreceptor drums 3 are successively superimposed and transferred onto the intermediate transfer belt 61. As a result, a color toner image (multicolor toner image) is formed on the intermediate transfer belt 61. The intermediate transfer belt 61 is formed having an endless shape using a film having a thickness of, for example, approximately 100 μm to 150 μm.

The transfer of the toner images from the photoreceptor drums 3 to the intermediate transfer belt 61 is performed by the intermediate transfer rollers 64 which are in contact with the rear side of the intermediate transfer belt 61. A high-voltage transfer bias (a high voltage having the opposite polarity (+) to the charge polarity of the toner (−)) for transferring the toner images is applied to the intermediate transfer rollers 64. The intermediate transfer rollers 64 are rollers formed based on a metal (for example, stainless steel) shaft with a diameter of 8 mm to 10 mm, and the surfaces are covered with a conductive elastic material (such as EPDM or urethane foam). The conductive elastic material enables a high voltage to be uniformly applied to the intermediate transfer belt 61.

The electrostatic latent images visualized on the photoreceptor drums 3 corresponding to each hue are stacked on the intermediate transfer belt 61, and then transferred onto a paper sheet by a transfer roller 10 disposed in a contact position between the paper sheet and the intermediate transfer belt 61.

At this time, the intermediate transfer belt 61 and the transfer roller 10 are pressed against each other at a predetermined nip. Further, a voltage is applied to the transfer roller 10 in order to transfer the toner to the paper sheet (a high voltage having the opposite polarity (+) to the charge polarity of the toner (−)).

Moreover, as described above, the toner attached to the intermediate transfer belt 61 as a result of making contact with the photoreceptor drums 3 or the toner remaining on the intermediate transfer belt 61 due to transfer not being performed onto the paper sheet by the transfer roller 10, is removed and collected by the intermediate transfer belt cleaning unit 65 since such toner causes mixing of the toner colors in the subsequent step.

The intermediate transfer belt cleaning unit 65 includes, for example, a cleaning blade serving as a cleaning member that makes contact with the intermediate transfer belt 61. The surface of the intermediate transfer belt 61 on the opposite side to the surface that makes contact with the cleaning blade is supported by the intermediate transfer belt driven roller 63.

The paper feeding cassette 81 is a tray for storing paper sheets to be used in image formation, and is provided on the lower side of the exposure unit 1 of the printer 110. Furthermore, the manual paper feeding cassette 82 is provided on a side surface of the printer 110. In the image forming device 100, paper sheets can also be manually set in the manual paper feeding cassette 82.

The printer 110 further includes a paper discharge tray 91. The paper discharge tray 91 accumulates printed paper sheets in a face-down manner.

Furthermore, the printer 110 is provided with a sheet transport path S for transporting the paper sheets in the paper feeding cassette 81 and the manual paper feeding cassette 82 to the paper discharge tray 91 via the transfer roller 10 and the fusing unit 7. Pickup rollers 11*a* and 11*b*, a plurality of transport rollers 12*a* to 12*d*, a registration roller 13, the transfer roller 10, the fusing unit 7, and the like are disposed along the sheet transport path S from the paper feeding cassette 81 or the manual paper feeding cassette 82 to the paper discharge tray 91.

The transport rollers 12*a* to 12*d* are small rollers for assisting the transport of the paper sheets, and are disposed along the sheet transport path S. The pickup roller 11*a* is disposed in the vicinity of an end of the paper feeding cassette 81, picks up the paper sheets one by one from the paper feeding cassette 81, and supplies the paper sheets to the sheet transport path S. Similarly, the pickup roller 11*b* is disposed in the vicinity of an end of the manual paper feeding cassette 82, picks up the paper sheets one by one from the manual paper feeding cassette 82, and supplies the paper sheets to the sheet transport path S.

The registration roller 13 temporarily holds a paper sheet being transported in the sheet transport path S. The registration roller 13 transports a paper sheet to the transfer roller 10 at a timing when a leading edge of the toner image on the intermediate transfer belt 61 is aligned with the leading edge of the paper sheet.

The fusing unit 7 includes a heat roller 71 and a pressure roller 72. The heat roller 71 and the pressure roller 72 rotate with a paper sheet held between them. Furthermore, the heat roller 71 is set to a predetermined fusing temperature based on a signal from a temperature detector (not shown). Then, the heat roller 71, together with the pressure roller 72, thermally compresses the toner onto the paper sheet. As a result, the fusing unit 7 can melt, mix, and press the multicolor toner image that has been transferred onto the paper sheet, and thermally fuse the toner image onto the paper sheet. The fusing unit 7 includes an external heating belt 73 for externally heating the heat roller 71.

Movement Mechanism

Figure 2:
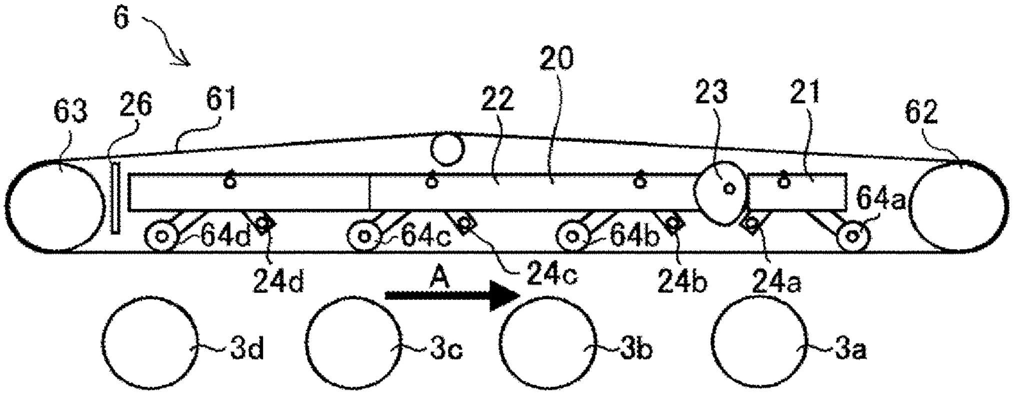
FIG. 2 is a diagram schematically showing an example of a configuration when all of the intermediate transfer rollers provided in an intermediate transfer belt unit according to the embodiment of the present disclosure are in a separated position.
Figure 3:
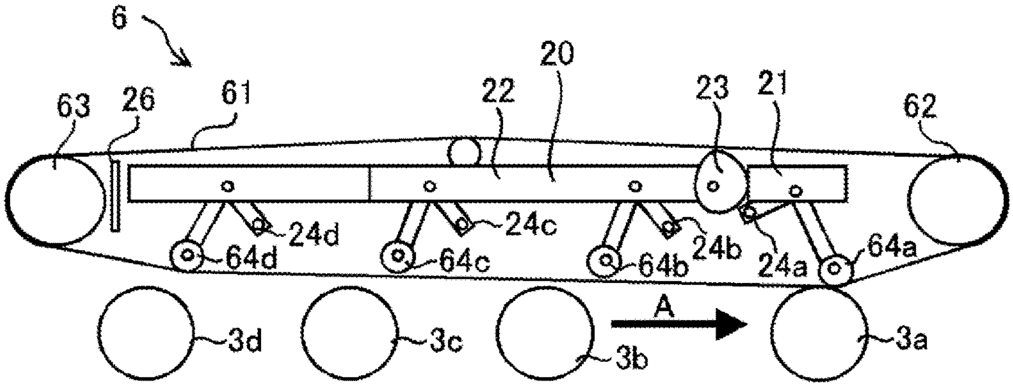
FIG. 3 is a diagram schematically showing an example of a configuration when the intermediate transfer rollers provided in the intermediate transfer belt unit according to the embodiment of the present disclosure are in a pressing position and a retracted position.
Figure 4:
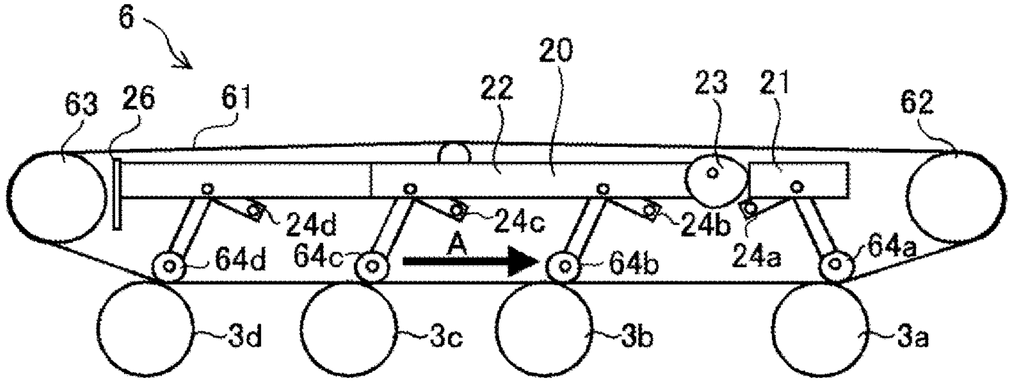
FIG. 4 is a diagram schematically showing an example of a configuration when all of the intermediate transfer rollers provided in the intermediate transfer belt unit according to the embodiment of the present disclosure are in the pressing position.
Figure 5:
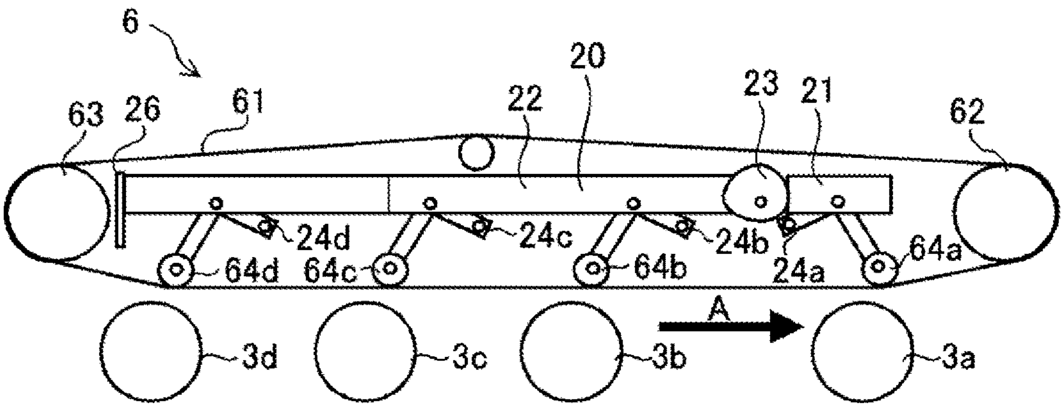
FIG. 5 is a diagram schematically showing an example of a configuration when all of the intermediate transfer rollers provided in the intermediate transfer belt unit according to the embodiment of the present disclosure are in the retracted position.

Next, a configuration of the movement mechanism 20 provided in the intermediate transfer belt unit 6 will be described with reference to FIGS. 2 to 5. FIG. 2 is a diagram schematically showing an example of a configuration when all of the intermediate transfer rollers 64 provided in the intermediate transfer belt unit 6 according to the embodiment of the present disclosure are in a separated position (second position). FIG. 3 is a diagram schematically showing an example of a configuration when the intermediate transfer rollers 64 provided in the intermediate transfer belt unit 6 according to the embodiment of the present disclosure are in a pressing position (first position) and a retracted position (third position). FIG. 4 is a diagram schematically showing an example of a configuration when all of the intermediate transfer rollers 64 provided in the intermediate transfer belt unit 6 according to the embodiment of the present disclosure are in the pressing position (first position). FIG. 5 is a diagram schematically showing an example of a configuration when all of the intermediate transfer rollers 64 provided in the intermediate transfer belt unit 6 according to the embodiment of the present disclosure are in the retracted position. FIGS. 2 to 5 are diagrams of the intermediate transfer belt unit 6 when viewed from the front side of the image forming device 100.

As shown in FIGS. 2 to 5, the intermediate transfer belt 61 is stretched between the intermediate transfer belt drive roller 62 and the intermediate transfer belt driven roller 63, and forms a predetermined loop-shaped movement path. The photoreceptor drum 3*a*, the photoreceptor drum 3*b*, the photoreceptor drum 3*c*, and the photoreceptor drum 3*d* are disposed on the outer peripheral surface side of the intermediate transfer belt 61 in this order from the downstream side of the movement direction A of the intermediate transfer belt 61. The first intermediate transfer roller 64*a* to fourth intermediate transfer roller 64*d* are disposed in positions facing the photoreceptor drums 3*a* to 3*d* with the intermediate transfer belt 61 held therebetween. In the present embodiment, the intermediate transfer belt 61 is disposed between the photoreceptor drums 3 and the intermediate transfer rollers 64 disposed above the photoreceptor drums 3.

The intermediate transfer rollers 64 are capable of moving due to the movement mechanism 20 so as to make contact with, and separate from, the respective opposing photoreceptor drums 3. Further, the movement mechanism 20 is configured so as to be capable of switching, according to the rotation angle of cams 23, the positions of the intermediate transfer rollers 64 to one of the pressing position (first position), in which the intermediate transfer belt 61 is pressed against the photoreceptor drums 3, the separated position (second position) which is separated from the photoreceptor drums 3, and the retracted position (third position), which is a position that is separated from the photoreceptor drums 3 but having a smaller separation distance from the photoreceptor drums 3 than the separated position.

The separated position is the position of the intermediate transfer rollers 64 when the intermediate transfer belt unit 6 is detached from the image forming device 100. When in the separated position, the intermediate transfer rollers 64 are in a position that is, for example, 5 mm away from the photoreceptor drums 3.

Furthermore, the pressing position is the position of the intermediate transfer rollers 64 when the toner image formed on the photoreceptor drums 3 is transferred to the intermediate transfer belt when printing is executed, and is a position in which the intermediate transfer rollers 64 press the photoreceptor drums 3 via the intermediate transfer belt 61. When color printing is executed, each of the first intermediate transfer roller 64*a* to fourth intermediate transfer roller 64*d* moves to a position that presses the corresponding photoreceptor drum 3*a* to photoreceptor drum 3*d*. However, when monochrome printing is performed, only the first intermediate transfer roller 64*a* that presses the photoreceptor drum 3*a* (first image carrier) corresponding to K moves to the pressing position, and the second intermediate transfer roller 64*b* to fourth intermediate transfer roller 64*d* move to the retracted position.

The retracted position is the position of the intermediate transfer rollers 64 when the image forming device 100 in print standby. When in the retracted position, the intermediate transfer rollers 64 are in a position that is, for example, in a near position that is 1 mm to 2 mm away from the photoreceptor drums 3. Note that print standby is a state where the image forming device 100 is waiting for a print execution instruction.

Specifically, in the intermediate transfer belt unit 6, when the intermediate transfer rollers 64 are in the separated position, for example, as shown in FIG. 2, each of the first intermediate transfer roller 64*a* to fourth intermediate transfer roller 64*d* are in a position that is sufficiently separated from the photoreceptor drum 3*a* to photoreceptor drum 3*d*. At this time, the intermediate transfer belt 61 is also in a position that is separated from each of the photoreceptor drum 3*a* to photoreceptor drum 3*d*.

Furthermore, at the time of monochrome printing, for example, as shown in FIG. 3, the first intermediate transfer roller 64*a* corresponding to K is disposed in the pressing position and causes the intermediate transfer belt 61 to make pressing contact with the photoreceptor drum 3*a*. On the other hand, the second intermediate transfer roller 64*b* to fourth intermediate transfer roller 64*d* for colors corresponding to each of Y, M, and C, are each disposed in the retracted position, which causes the intermediate transfer belt 61 to be separated from each of the photoreceptor drum 3*b* to photoreceptor drum 3*d*.

Moreover, at the time of color printing, for example, as shown in FIG. 4, each of the first intermediate transfer roller 64*a* to fourth intermediate transfer roller 64*d* are disposed in the pressing position, which causes the intermediate transfer belt 61 to make pressing contact with each of the photoreceptor drum 3*a* to photoreceptor drum 3*d*.

In addition, during print standby, for example, as shown in FIG. 5, each of the first intermediate transfer roller 64*a* to fourth intermediate transfer roller 64*d* are in a position that is separated from, but close to, each of the photoreceptor drum 3*a* to the photoreceptor drum 3*d*.

When the movement mechanism 20 sets the position of the intermediate transfer rollers 64 to the pressing position, the movement mechanism 20 moves the intermediate transfer rollers 64 that are in a state of being held in the retracted position to the pressing position. In other words, the movement mechanism 20 switches the intermediate transfer rollers 64 from a state of being held the retracted position to the pressing position. In this way, when the intermediate transfer rollers 64 are moved to the pressing position, the movement distance of the intermediate transfer rollers 64 can be reduced by controlling the intermediate transfer rollers 64 so as to move from the retracted position. Therefore, the impact noise generated when the photoreceptor drums 3 are pressed by the intermediate transfer rollers 64 can be suppressed.

Further, as described above, the movement of the first intermediate transfer roller 64*a* to fourth intermediate transfer roller 64*d* is performed by the movement mechanism 20. The configuration of the movement mechanism 20 will be described below.

The movement mechanism 20 includes first link members 21, second link members 22, cams 23, and a first swing member 24*a* to fourth swing member 24*d*.

The first link members 21 are members that are joined to the first swing member 24*a* provided with the first intermediate transfer roller 64*a* on a leading edge. Furthermore, the second link members 22 are members that are joined to the second swing member 24*b* to fourth swing member 24*d* each provided with the second intermediate transfer roller 64*b* to fourth intermediate transfer roller 64*d* on a leading edge.

As shown in FIG. 2, when the intermediate transfer belt unit 6 is viewed from the side, the first link member 21 and the second link member 22 are disposed so as to extend on the same straight line along the movement direction A of the intermediate transfer belt 61. The first link member 21 and the second link member 22 are provided so as to be capable of moving within a predetermined range along the movement direction A. Note that the cam 23 are disposed between the first link member 21 and the second link member 22.

Figure 6:
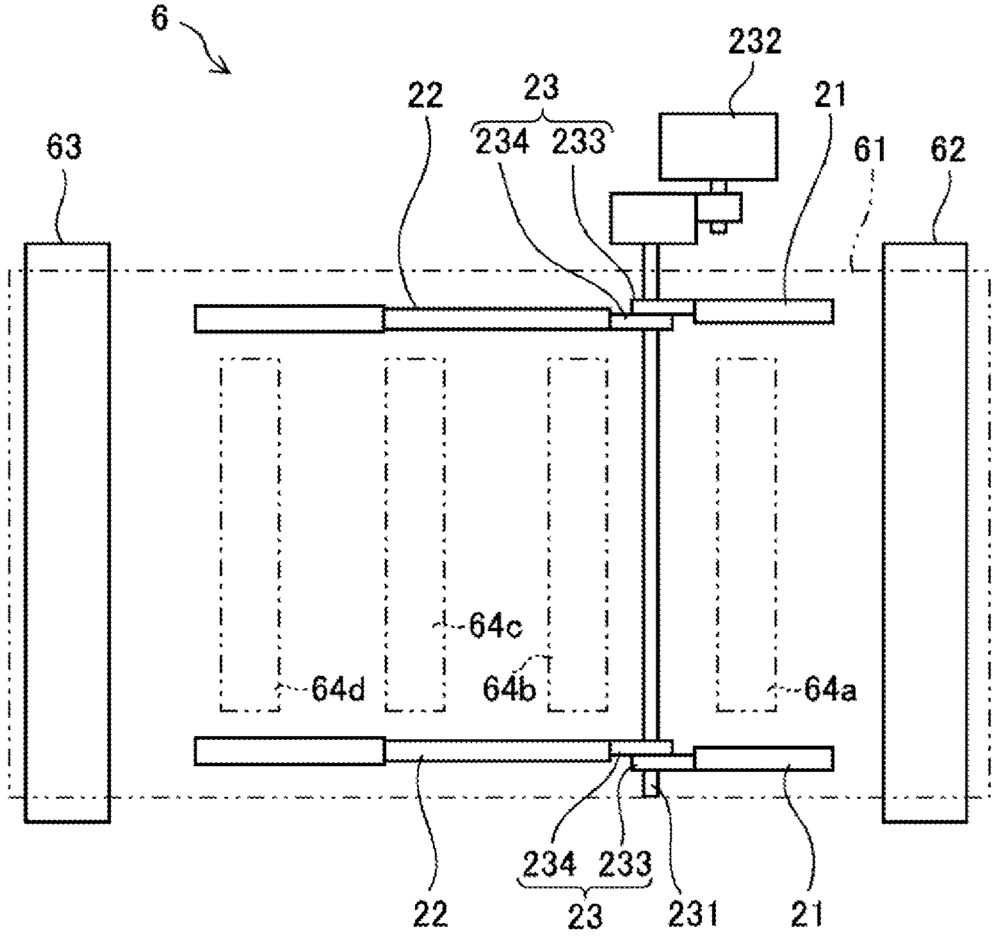
FIG. 6 is a plan view of the intermediate transfer belt unit shown in FIG. 2.

The cams 23 are a flat cam having an asymmetric outline (outer peripheral shape). As shown in FIG. 6, the cams 23 include a first cam 233 that switches the position of the first intermediate transfer roller 64*a*, and a second cam 234 that switches the position of each of the second intermediate transfer roller 64*b* to fourth intermediate transfer roller 64*d*. FIG. 6 is a plan view of the intermediate transfer belt unit 6 shown in FIG. 2. The distance from the center of each of the first cam 233 and the second cam 234 to the outer periphery is not constant, and the outer peripheral shapes of the first cam 233 and the second cam 234 are different. The detailed configuration of the cams 23 will be described later.

Furthermore, as shown in FIG. 6, the first link members 21, the second link members 22, and the cams 23 are disposed are respectively disposed on the front side and the rear side of the image forming device 100 between the intermediate transfer belt drive roller 62 and the intermediate transfer belt driven roller 63.

The first intermediate transfer roller 64*a* is supported via the first swing member 24*a* between the first link member 21 disposed on the front side and the first link member 21 disposed on the rear side. On the other hand, the second intermediate transfer roller 64*b* to fourth intermediate transfer roller 64*d* are supported via each of the second swing member 24*b* to fourth swing member 24*d* between the second link member 22 disposed on the front side and the second link member 22 disposed on the rear side.

The cam 23 on the front side and the cam 23 on the rear side are fixed to a single cam shaft 231, and rotate in the same phase to each other around the cam shaft 231. The cam shaft 231 is rotated by power transmitted from a drive source 232. For example, a stepping motor is used as the drive source 232. The intermediate transfer belt unit 6 is configured so that the rotation angle of the cams 23 can be grasped from the rotation speed and rotation time of the cams 23.

Furthermore, as a result of the first cam 233 of the cams 23 rotating, the first link members 21 making pressing contact with the first cams 233 approach and separate from the cam shaft 231 according to the outer peripheral shape of the first cams 233. In this way, the first link members 21 move along the movement direction A according to the outer peripheral shape of the first cams 233.

Furthermore, as a result of the second cam 234 of the cams 23 rotating, the second link members 22 making pressing contact with the second cams 234 move along the movement direction A according to the outer peripheral shape of the second cams 234.

Figure 7:
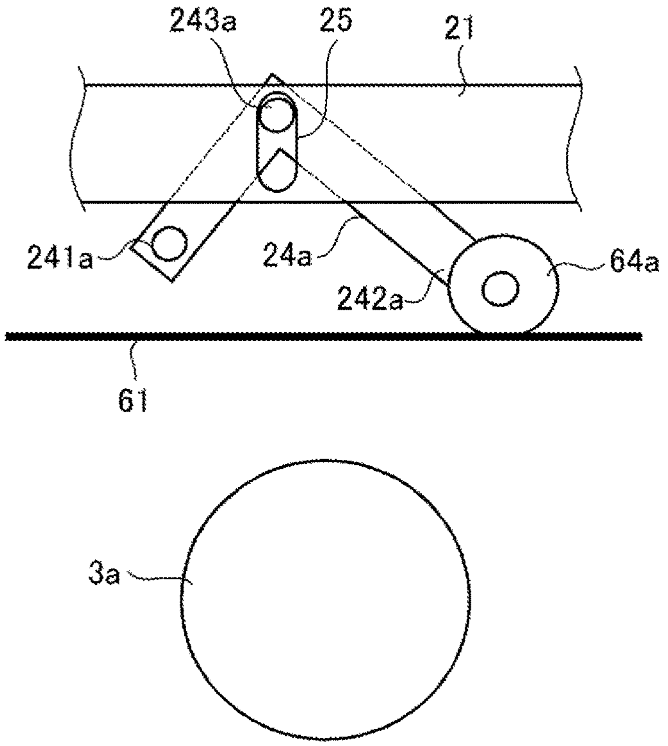
FIG. 7 is a schematic diagram showing an example of the main components of a first swing member included in the intermediate transfer belt unit according to the embodiment of the present disclosure.
Figure 8:
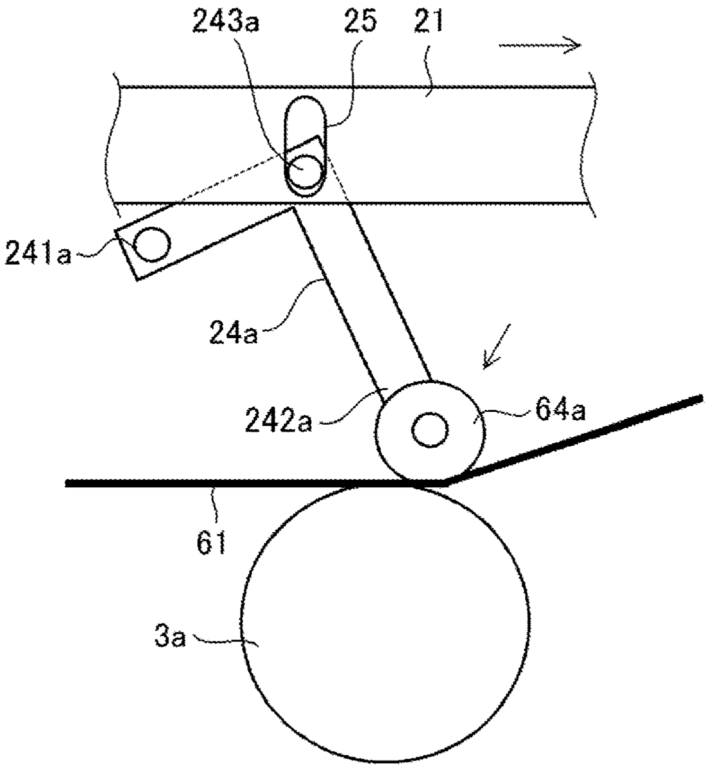
FIG. 8 is a schematic diagram showing an example of the main components of a first swing member included in the intermediate transfer belt unit according to the embodiment of the present disclosure.

Here, the configuration of the first swing member 24*a* to fourth swing member 24*d* will be described in more detail with reference to FIGS. 7 and 8. Note that the first swing member 24*a* has the same configuration as the second swing member 24*b* to fourth swing member 24*d* except for a difference in installation direction. Further, for convenience of description, the first swing member 24*a* will be described as an example. FIGS. 7 and 8 are schematic diagrams showing an example of the main components of the first swing member 24*a* included in the intermediate transfer belt unit 6 according to the embodiment of the present disclosure. Note that the first swing member 24*a*, and the second swing member 24*b* to fourth swing member 24*d* are installed left-right symmetrically in FIG. 4.

As shown in FIGS. 7 and 8, the first swing member 24*a* has a shape which is bent in a letter-L shape. A first end 241*a*, which is one end of the first swing member 24*a*, is rotatably supported by a frame (not shown) of the intermediate transfer belt unit 6 in a position further on the photoreceptor drum 3*a* side than the first link member 21. A second end 242*a*, which is another end of the first swing member 24*a*, is rotatably supported by the first intermediate transfer roller 64*a*. Furthermore, the first swing member 24*a* is biased in a direction in which the first intermediate transfer roller 64*a* separates from the photoreceptor drum 3*a*, or in other words, toward the upper side, by an elastic member (not shown).

Moreover, as shown in FIGS. 7 and 8, the first link member 21 is provided with a slit 25, which is in a position facing the photoreceptor drum 3*a*, and extends in a direction that is orthogonal to the movement direction A in a side view.

The first swing member 24*a* has, on the bent portion, a projection 243*a* that protrudes in the rotation axis direction of the first intermediate transfer roller 64*a*. The projection 243*a* is capable of moving inside the slit 25 of the first link member 21 along the longitudinal direction of the slit 25.

When the first link member 21 is in a position close to the cam shaft 231, the first intermediate transfer roller 64*a* provided on the another end of the first swing member 24*a* is, as shown in FIG. 7, lifted upward with the first swing member 24*a* by the biasing force from the elastic member. At this time, the projection 234*a* is positioned at the upper end of the slit 25, or in other words, at the end on the side that is away from the photoreceptor drum 3*a*. In this way, when the intermediate transfer rollers 64 are in a position separated from the photoreceptor drum 3*a*, the intermediate transfer belt 61 is also in a position separated from the photoreceptor drum 3*a*.

On the other hand, when the first link member 21 moves to a position that is more separated than the position near the cam shaft 231, as shown in FIG. 8, the first swing member 24*a* is lowered against the biasing force from the elastic member, and the first intermediate transfer roller 64*a* moves to the pressing position. As a result, the intermediate transfer belt 61 is capable of making pressing contact with the photoreceptor drum 3*a*.

Similarly, when the second link member 22 is in a position near the cam shaft 231, each of the second intermediate transfer roller 64*b* to fourth intermediate transfer roller 64*d* move to the separated position. On the other hand, when the second link member 22 moves to a position that is more separated than the position near the cam shaft 231, each of the second intermediate transfer roller 64*b* to fourth intermediate transfer roller 64*d* are lowered and move to the pressing position. As a result, the intermediate transfer belt 61 is capable of making pressing contact with the photoreceptor drums 3*b* to 3*d*.

Figure 9:
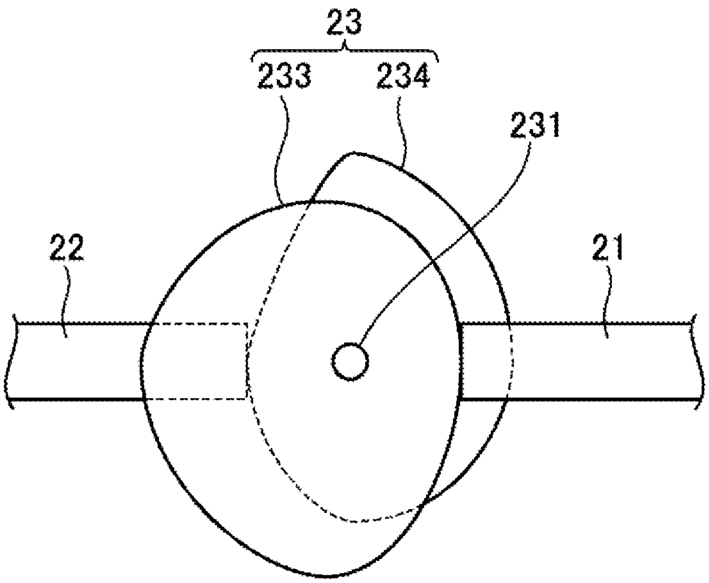
FIG. 9 is a diagram showing an example of the configuration of a cam included in the intermediate transfer belt unit according to the embodiment of the present disclosure.
Figure 10:
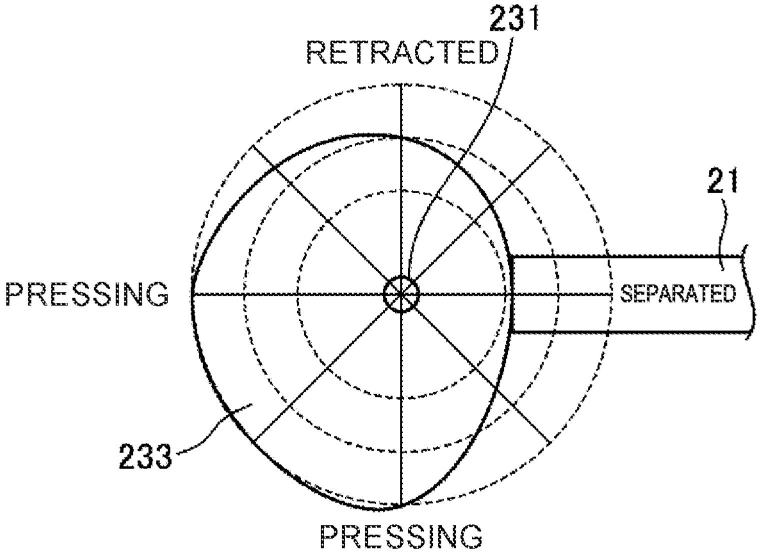
FIG. 10 is a diagram showing an example of a first cam of the cam shown in FIG. 9.

Next, the cam 23 will be described in more detail with reference to FIGS. 9 to 11. FIG. 9 is a diagram showing an example of the configuration of the cam 23 included in the intermediate transfer belt unit 6 according to the embodiment of the present disclosure. FIG. 10 is a diagram showing an example of the first cam 233 of the cam 23 shown in FIG. 9. Furthermore, FIG. 11 is a diagram showing an example of the second cam 234 of the cam 23 shown in FIG. 9.

As shown in FIG. 9, the first cam 233 and the second cam 234 are fixed to the cam shaft 231 in positions that are offset in the front-rear direction of the intermediate transfer belt unit 6, and rotate around the cam shaft 231. The first link member 21 makes contact with the outer periphery of the first cam 233. The second link member 22 makes contact with the outer periphery of the second cam 234.

For example, in the intermediate transfer belt unit 6, when the first intermediate transfer roller 64*a* is in the separated position, as shown in FIG. 10, the first link member 21 is disposed so as to make contact with a peripheral edge that minimizes the distance from the center of the first cam 233 (cam shaft 231) to the outer periphery. Furthermore, when the first intermediate transfer roller 64*a* is in the pressing position, as shown in FIG. 10, the first link member 21 is disposed so as to make contact with a peripheral edge that maximizes the distance from the center of the first cam 233 (cam shaft 231) to the outer periphery. Moreover, when the first intermediate transfer roller 64*a* is in the retracted position, as shown in FIG. 10, the first link member 21 is disposed so as to make contact with a peripheral edge such that the distance from the center of the first cam 233 to the outer periphery is between the distance when the first intermediate transfer roller 64*a* is in the separated position and the distance when the first intermediate transfer roller 64*a* is in the pressing position.

In addition, as shown in FIG. 11, when each of the second intermediate transfer roller 64*b* to fourth intermediate transfer roller 64*d* are in the separated position, the second link member 22 is disposed so as to make contact with a peripheral edge that minimizes the distance from the center of the second cam 234 (cam shaft 231) to the outer periphery. Also, when each of the second intermediate transfer roller 64*b* to fourth intermediate transfer roller 64*d* are in the pressing position, as shown in FIG. 11, the second link member 22 is disposed so as to make contact with a peripheral edge that maximizes the distance from the center of the second cam 234 (cam shaft 231) to the outer periphery. Moreover, when each of the second intermediate transfer roller 64*b* to fourth intermediate transfer roller 64*d* are in the retracted position, as shown in FIG. 11, the second link member 22 is disposed so as to make contact with a peripheral edge such that the distance from the center of the second cam 234 to the outer periphery is between the distance when each of the second intermediate transfer roller 64*b* to fourth intermediate transfer roller 64*d* are in the separated position and the distance when the second intermediate transfer roller 64*b* to fourth intermediate transfer roller 64*d* are in the pressing position.

For example, the positions of the first cam 233 and the second cam 234 when the first intermediate transfer roller 64*a* is in the separated position, and each of the second intermediate transfer roller 64*b* to fourth intermediate transfer roller 64*d* are in the separated position is assumed to be the initial position. From the initial position, when the first cam 233 and the second cam 234 are rotated clockwise 90 degrees at a time, the position of each of the first intermediate transfer roller 64*a* to fourth intermediate transfer roller 64*d* and the state of the image forming device 100 have the relationship shown in the table in FIG. 12. FIG. 12 is a table showing a correspondence relationship between the rotation angle of the cam 23 included in the intermediate transfer belt unit 6 according to the embodiment of the present disclosure, the operation state of the image forming device 100, the position of the first intermediate transfer roller 64*a*, and the position of the second intermediate transfer roller 64*b* to fourth intermediate transfer roller 64*d*. Note that the rotation angle of the cam 23 here is the rotation angle of the first cam 233 and the second cam 234.

That is, as shown in FIG. 12, when the cam 23 is in the initial position, or in other words, when the rotation angle of the cam 23 is 0 degrees, the first intermediate transfer roller 64*a* and each of the second intermediate transfer roller 64*b* to fourth intermediate transfer roller 64*d* are positioned in the separated position. At this time, the operation state of the image forming device 100 is detachment of the intermediate transfer belt unit 6.

When the cam 23 rotates 90 degrees from the initial position, the first intermediate transfer roller 64*a* and each of the second intermediate transfer roller 64*b* to fourth intermediate transfer roller 64*d* are positioned in the retracted position. At this time, the operation state of the image forming device 100 is print standby.

When the cam 23 rotates 180 degrees from the initial position, the first intermediate transfer roller 64*a* is positioned in the pressing position, and each of the second intermediate transfer roller 64*b* to fourth intermediate transfer roller 64*d* are positioned in the retracted position. At this time, the operation state of the image forming device 100 is monochrome printing.

Furthermore, when the cam 23 rotates 270 degrees from the initial position, the first intermediate transfer roller 64*a* and the second intermediate transfer roller 64*b* to fourth intermediate transfer roller 64*d* are positioned in the pressing position. At this time, the operation state of the image forming device 100 is color printing.

As described above, the intermediate transfer belt unit 6 is capable of switching the positions of the first intermediate transfer roller 64*a* to fourth intermediate transfer roller 64*d* between the separated position, the retracted position, and the pressing position by changing the rotation angle of the cam 23 according to the operation state of the image forming device 100. In particular, when the image forming device 100 is in print standby, it is possible to position the first intermediate transfer roller 64*a* to fourth intermediate transfer roller 64*d* in the retracted position. As a result, it is possible to suppress the impact noise generated when the operation state of the image forming device 100 transitions from print standby to monochrome printing or color printing, and the photoreceptor drums 3*a* to 3*d* are pressed by the first intermediate transfer roller 64*a* to fourth intermediate transfer roller 64*d*.

Modification

Next, the intermediate transfer belt unit 6 according to a modification of the embodiment of the present disclosure will be described with reference to FIGS. 13 and 14. FIG. 13 is a diagram showing an example of a cam 123 included in the intermediate transfer belt unit 6 according to the modification of the embodiment of the present disclosure. FIG. 14 is a table showing a correspondence relationship between the rotation angle of the cam 123 included in the intermediate transfer belt unit 6 according to the modification of the embodiment of the present disclosure, the operation state of the image forming device 100, the position of the first intermediate transfer roller 64*a*, and the position of the second intermediate transfer roller 64*b* to fourth intermediate transfer roller 64*d*.

The cam 23 provided in the intermediate transfer belt unit 6 according to the embodiment of the present disclosure is constituted by two flat cams, namely the first cam 233 and the second cam 234 as described above. In contrast, the intermediate transfer belt unit 6 according to the modification of the embodiment of the present disclosure differs in that it includes a cam 123 constituted by a single flat cam instead of the cam 23. The intermediate transfer belt unit 6 according to the modification of the embodiment of the present disclosure has the same configuration as the intermediate transfer belt unit 6 according to the embodiment except in that the cam 123 is provided instead of the cam 23. Therefore, the same members are denoted by the same reference numerals, and the descriptions will be omitted.

As shown in FIG. 13, the outer periphery of the cam 123 includes a first peripheral edge 123*a*, which is a right half outer edge, and a second peripheral edge 123*b*, which is the left half outer edge with respect to a straight line that vertically intersects the cam shaft 231 in the up-down direction.

In the cam 123, the distance between the first link member 21 and the cam shaft 231 changes according to the shape of the first peripheral edge 123*a* as the cam 123 rotates. In this way, the position of the first intermediate transfer roller 64*a* can be switched according to the change in the distance between the first link member 21 and the cam shaft 231.

That is, when the distance between the cam shaft 231 and the contact position between first link member 21 and the first peripheral edge 123*a* is a smallest first distance, the first intermediate transfer roller 64*a* is in the separated position. When the distance between the cam shaft 231 and the contact position between first link member 21 and the first peripheral edge 123*a* is a largest second distance, the first intermediate transfer roller 64*a* is in the pressing position. Furthermore, when the distance between the cam shaft 231 and the contact position between first link member 21 and the first peripheral edge 123*a* is longer than the first distance mentioned above, but shorter than the second distance, the first intermediate transfer roller 64*a* is in the retracted position.

Moreover, in the cam 123, the distance between the second link member 22 and the cam shaft 231 changes according to the shape of the second peripheral edge 123*b* as the cam 123 rotates. In this way, the positions of the second intermediate transfer roller 64*b* to fourth intermediate transfer roller 64*d* can be switched according to the change in the distance between the second link member 22 and the cam shaft 231.

That is, when the distance between the cam shaft 231 and the contact position between second link member 22 and the second peripheral edge 123*b* is a smallest third distance, the second intermediate transfer roller 64*b* to fourth intermediate transfer roller 64*d* are in the separated position. When the distance between the cam shaft 231 and the contact position between second link member 22 and the second peripheral edge 123*b* is a largest fourth distance, the second intermediate transfer roller 64*b* to fourth intermediate transfer roller 64*d* are in the pressing position. Furthermore, when the distance between the cam shaft 231 and the contact position between second link member 22 and the second peripheral edge 123*b* is longer than the third distance mentioned above, but shorter than the fourth distance, the second intermediate transfer roller 64*b* to fourth intermediate transfer roller 64*d* are in the retracted position.

Here, a state where the first intermediate transfer roller 64*a* and each of the second intermediate transfer roller 64*b* to fourth intermediate transfer roller 64*d* are in the separated position is assumed to be the initial position. When the cam 123 rotates clockwise from the initial position, as shown in FIG. 14, the positions of each of the first intermediate transfer roller 64*a* to fourth intermediate transfer roller 64*d* are switched.

Specifically, when the cam 123 is in the initial position, or in other words, when the rotation angle of the cam 123 is 0 degrees, the first intermediate transfer roller 64*a* and each of the second intermediate transfer roller 64*b* to fourth intermediate transfer roller 64*d* are positioned in the separated position. At this time, the operation state of the image forming device 100 is detachment of the intermediate transfer belt unit 6.

When the cam 123 rotates 45 degrees from the initial position, the first intermediate transfer roller 64*a* and each of the second intermediate transfer roller 64*b* to fourth intermediate transfer roller 64*d* are positioned in the retracted position. At this time, the operation state of the image forming device 100 is print standby.

When the cam 123 rotates 90 degrees from the initial position, the first intermediate transfer roller 64*a* is positioned in the pressing position, and each of the second intermediate transfer roller 64*b* to fourth intermediate transfer roller 64*d* are positioned in the retracted position. At this time, the operation state of the image forming device 100 is monochrome printing.

Furthermore, when the cam 123 rotates 135 degrees from the initial position, the first intermediate transfer roller 64*a* and the second intermediate transfer roller 64*b* to fourth intermediate transfer roller 64*d* are positioned in the pressing position. At this time, the operation state of the image forming device 100 is color printing.

Note that the intermediate transfer belt unit 6 according to the modification of the embodiment has a configuration in which the position of the first intermediate transfer roller 64*a* is switched by the position of the first peripheral edge 123*a* according to the rotation angle of the cam 123, and the positions of the second intermediate transfer roller 64*b* to fourth intermediate transfer roller 64*d* are switched by the position of the second peripheral edge 123*b*. As a result, the rotation direction of the cam 123 is configured to be reversed when rotated by 135 degrees from the initial position.

As described above, because the intermediate transfer belt unit 6 according to the modification of the embodiment includes the cam 123, the number of components constituting the cam can be reduced compared to the intermediate transfer belt unit 6 according to the embodiment. However, the intermediate transfer belt unit 6 according to the embodiment has a larger rotation angle for switching the position of the intermediate transfer rollers 64 than the intermediate transfer belt unit 6 according to the modification of the embodiment, and the rotation angle is also a single direction. As a result, a switching control of the positions of the intermediate transfer rollers 64 can be more easily performed in the intermediate transfer belt unit 6 according to the embodiment than the intermediate transfer belt unit 6 according to the modification of the embodiment.

The image forming device 100 includes an operation button (not shown), and a configuration is possible in which a detachment instruction of the intermediate transfer belt unit 6 is received by the operation button. In such a configuration, in the intermediate transfer belt unit 6, the movement mechanism 20 moves the positions of the first intermediate transfer roller 64*a* to fourth intermediate transfer roller 64*d* to the separated position only when a detachment instruction is received. Further, when a detachment instruction is not received, a configuration is possible in which the movement mechanism 20 switches the positions of the first intermediate transfer roller 64*a* to fourth intermediate transfer roller 64*d* to either the retracted position or the pressing position according to the operation state of the image forming device 100.

In this way, when a detachment instruction is not received, the movement mechanism 20 controls the positions of the first intermediate transfer roller 64*a* to fourth intermediate transfer roller 64*d* so as to switch to either the retracted position or the pressing position. Therefore, the switching control of the positions becomes easier.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image forming device comprising:

a first image carrier on which a monochrome toner image is formed;

a plurality of second image carriers, each provided for one of different colors, on which toner images are formed in the different colors;

a transfer belt that transfers the toner images, each formed on one of the first image carrier and the plurality of second image carriers;

a first presser that presses the transfer belt against the first image carrier and a plurality of second pressers that presses the transfer belt against each of the plurality of second image carriers to transfer the monochrome toner image and the toner images formed in the different colors onto the transfer belt; and a switching mechanism that switches a position of each of the first presser and the plurality of second pressers according to a rotation angle of a cam, wherein the switching mechanism switches each of the first presser and the plurality of the second pressers to stop at one of a first position that presses the transfer belt against each of the first image carrier and the plurality of second image carriers, a second position that separates from the first image carrier and the plurality of second image carriers, and a third position that is a position separating from the first image carrier and the plurality of second image carriers and having a smaller separation distance from each of the first image carrier and the plurality of second image carries than the second position, the switching mechanism has:

the cam provided rotatably about a rotating shaft, and having a center and an outer periphery such that a distance from the center to the outer periphery varies according to a position of the outer periphery, a link member that makes contact with the cam, the link member being movable along the transfer belt according to a rotation of the cam, and a first swing member and a plurality of second swing members each of which is a member formed into a letter-L shape, the first swing member and the plurality of second swing members being rotatably supported by a frame that holds the transfer belt, the first swing member having an end provided with the first presser, and the plurality of second swing members each having an end provided with one of the plurality of second pressers, when the cam rotates, the link member moves to rotate the end included in the first swing member and provided with the first presser and the end included in each of the plurality of the second swing members and provided with each of the plurality of second pressers, such that the position of each of the first presser and the plurality of second pressers changes, and at the third position, a distance between each of the plurality of second pressers and a corresponding one of the plurality of second image carriers is equal to a distance between the first presser and the first image carrier.

2. The image forming device according to claim 1, wherein the switching mechanism, when setting a position of each of the first presser and the plurality of second pressers to the first position, switches each of the first presser and the plurality of second pressers from the third position to the first position.

3. The image forming device according to claim 1, wherein the second position is a position of each of the first presser and the plurality of second pressers when each of the first presser and the plurality of second pressers is detached from the image forming device.

4. The image forming device according to claim 1, wherein the third position is a position of each of the first presser and the plurality of second pressers when the image forming device is in a print standby state.

5. The image forming device according to claim 1, wherein the switching mechanism, during monochrome printing, switches a position of the first presser to the first position, and also switches a position of each of the plurality of second pressers to the third position.

6. The image forming device according to claim 5, wherein the cam includes a first cam and a second cam that rotate by the same rotating shaft, and the switching mechanism switches the position of the first presser according to a rotation angle of the first cam, and also switches the position of each of the plurality of second pressers according to a rotation angle of the second cam.

7. The image forming device according to claim 5, wherein the outer periphery of the cam includes a first peripheral edge and a second peripheral edge, and the switching mechanism switches the position of the first presser based on a position of the first peripheral edge according to the rotation angle of the cam, and also switches the position of each of the plurality of second pressers based on a position of the second peripheral edge according to the rotation angle of the cam.

8. The image forming device according to claim 1, wherein the cam is disposed between the plurality of second pressers and the first presser that are disposed along a movement direction of the transfer belt, and the cam rotates to cause the plurality of second pressers to move in order to make contact with, and separate from, the plurality of second image carriers, and to cause the first presser to move in order to make contact with, and separate from, the first image carrier.

9. The image forming device according to claim 1, wherein the link member includes:

a first link member to cause the first swing member to rotate, and a second link member to cause the plurality of second swing members to rotate, the cam is disposed between the first link member and the second link member disposed in a line along the transfer belt, and the cam rotates to cause both the first link member and the second link member to move.

* * * * *